United States Patent
Lim et al.

(10) Patent No.: US 9,049,579 B2
(45) Date of Patent: Jun. 2, 2015

(54) METHOD AND APPARATUS FOR SETTING TERMINAL CONNECTION CONTROL INFORMATION IN A MOBILE COMMUNICATION SYSTEM

(75) Inventors: Chae Gwon Lim, Seoul (KR); Song Yean Cho, Seoul (KR); Beom Sik Bae, Suwon-si (KR); Han Na Lim, Seoul (KR); Sang Soo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 82 days.

(21) Appl. No.: 13/818,902

(22) PCT Filed: Aug. 31, 2011

(86) PCT No.: PCT/KR2011/006450
§ 371 (c)(1),
(2), (4) Date: Feb. 25, 2013

(87) PCT Pub. No.: WO2012/030156
PCT Pub. Date: Mar. 8, 2012

(65) Prior Publication Data
US 2013/0150030 A1 Jun. 13, 2013

(30) Foreign Application Priority Data

Aug. 31, 2010 (KR) .................. 10-2010-0084508

(51) Int. Cl.
*H04W 4/00* (2009.01)
*H04W 8/18* (2009.01)
*H04W 48/02* (2009.01)

(52) U.S. Cl.
CPC .............. *H04W 8/18* (2013.01); *H04W 48/02* (2013.01)

(58) Field of Classification Search
CPC ..... H04W 48/02; H04W 48/08; H04W 48/16; H04W 60/02
USPC .............................. 455/432.3, 435.1, 411, 436
See application file for complete search history.

(56) References Cited

U.S. PATENT DOCUMENTS

| | | | |
|---|---|---|---|
| 2010/0195573 A1* | 8/2010 | Gupta et al. ................... | 370/328 |
| 2010/0197307 A1* | 8/2010 | Horn et al. ................... | 455/435.1 |
| 2010/0330962 A1* | 12/2010 | Han et al. ...................... | 455/411 |
| 2011/0171953 A1* | 7/2011 | Faccin et al. ............... | 455/426.1 |

FOREIGN PATENT DOCUMENTS

| | | | | |
|---|---|---|---|---|
| KR | 10-2009-0029674 | 3/2009 | | |
| KR | 10-2009-0063089 | 6/2009 | | |
| KR | 10-2010-0008232 | 1/2010 | | |
| KR | 0-2010-0027925 | 3/2010 | | |
| SE | WO-2010/081565 | * | 7/2010 | .............. H04W 4/08 |

OTHER PUBLICATIONS

3GPP TR 23.830 V9.0.0. Sep. 2009.*

* cited by examiner

*Primary Examiner* — William Nealon
(74) *Attorney, Agent, or Firm* — Jefferson IP Law, LLP

(57) ABSTRACT

Provided a method and an apparatus for setting control information of a user equipment in a wireless communication system. The method and the apparatus determine control information for network access of the user equipment, allows the network access according to the control information to provide a network service to the user equipment. The wireless communication system can uniformly maintain a service quality for a plurality of UEs.

30 Claims, 14 Drawing Sheets

METHOD AND APPARATUS FOR SETTING TERMINAL CONNECTION CONTROL INFORMATION IN A MOBILE COMMUNICATION SYSTEM

BACKGROUND OF THE INVENTION

1. Field of the Invention

The present invention relates to a communication method in a wireless communication system and an apparatus thereof. More particularly, the present invention relate to a method of setting at least one a user equipment (UE) and a network node such that the UE accesses a network at only a specific time to receive a service, but a network access is blocked for a remaining time.

2. Description of the Related Art

In general, a mobile communication system has been developed to provide a voice service while ensuring activity of a user. However, the mobile communication system is expanding to a data service area as well as a voice service area, and has currently been developed to the extent capable of providing a high speed data service. However, since a resource is insufficient and users require a high speed service in the mobile communication system providing a current data service, there is a need for a more developed mobile communication system.

To meet such a demand, a protocol work with respect to Long Term Evolution (LTE) is in progress in the 3rd Generation Partnership Project (3GPP) as one system which is developing as a next generation mobile communication system. The LTE is a technology which is aimed at commercialization by the year 2010 and implements high speed packet based communication has transmission speed of maximum 100 Mbps. To this end, various approaches have been discussed. For example, there is a scheme of reducing the number of nodes located on a communication path by simplifying a configuration of a network structure or a scheme of fully approaching wireless protocols to a wireless channel.

However, it is expected that an extremely number of terminals than current terminal access a mobile communication system to receive a service. That is, a portable phone, a notebook computer, a tablet PC, a camera, a digital photo frame, a vending machine, a CCTV, a plurality of sensors, for example, an electrical measurement sensor, a water measurement sensor, a seismic sensor, a fire alarm sensor of buildings access the mobile communication system. Accordingly, the mobile communication system requires an improved management method as compared with a current method in order to manage a number of terminals.

SUMMARY OF THE INVENTION

The present invention has been made in view of the above problems, and provides a method of setting at least one of a UE or a network node so that a UE accesses a network at only a specific time to receives a service, and network access is blocked for a remaining time in order to efficiently manage a number of UE in a mobile communication system, and an apparatus thereof.

In accordance with an aspect of the present invention, a method of controlling access of a user equipment in a wireless communication system, the method includes: requesting subscribed time control information of the user equipment to a home subscriber server by a mobility management entity when the user equipment receives an NAS request; determining user equipment time control information based on the subscribed time control information by the mobility management entity when the home subscriber server receives the subscribed time control information; and transmitting an NAS response having the user equipment time control information to the user equipment by the mobility management entity.

In accordance with another aspect of the present invention, a method of controlling access of a user equipment in a wireless communication system, the method includes: requesting user equipment time control information of the user equipment to a home subscriber server by a mobility management entity (MME) when the user equipment receives an NAS request; determining and transmitting the user equipment time control information to the MME by the home subscriber server; and transmitting an NAS response having the user equipment time control information to the user equipment by the MME.

In accordance with another aspect of the present invention, a method of controlling access of a user equipment in a wireless communication system, the method includes: transmitting an NAS request to a mobility management entity; and receiving an NAS response having user equipment time information by the mobility management entity.

In accordance with another aspect of the present invention, a wireless communication system for controlling access of a user equipment, the system includes: a home subscriber server storing subscribed time control information of the user equipment; a mobility management entity requesting the subscribed time control information when the user equipment an NAS request, determining user equipment time control information based on the subscribed time control information when the home subscriber server receives the subscribed time control information, and transmitting an NAS response having the user equipment time control information to the user equipment.

In accordance with another aspect of the present invention, a wireless communication system for controlling access of a user equipment, the system includes: a home subscriber server determining user equipment time control information of the user equipment; and a mobility management entity requesting the subscribed time control information when the user equipment an NAS request, and transmitting an NAS response having the user equipment time control information to the user equipment when the home subscriber server receives the subscribed time control information.

In accordance with another aspect of the present invention, a user equipment for controlling access in a wireless communication system, the user equipment includes: a transceiver communicating with a mobility management entity; and a controller transmitting an NAS request to the mobility management entity, and controlling such that an NAS response having user equipment time control information is received from the mobility management entity.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

In a detailed description of embodiments of the present invention, an LTE is a main target. However, the basic concepts of the present invention are applicable to other communication systems having similar technical background and channel forms by applying variations and modifications falling within the spirit and scope of the present invention, and it will become apparent to those skilled in the art.

As used herein, the term "access control information" refers to a parameter for allowing network access of a UE in a wireless communication system. In this case, the access control information may be set to at least one of the UE or a network node in the wireless communication system. That is, the network node makes the UE possible to perform network access according to the access control information to provide a network service to the UE. The UE may perform the network access according to the access control information to use a network service through a network node.

The control information includes at least one of access granted information for granting the UE to perform the network access or access forbidden information for forbidding the network access. It is assumed in the embodiment that the control information is time-control (TC) information for allowing the UE to perform the network access, but the present invention is not limited thereto. That is, the control information includes various parameters indicating predetermined conditions for allowing the UE to perform the network access as well as the TC information.

Figure 1:
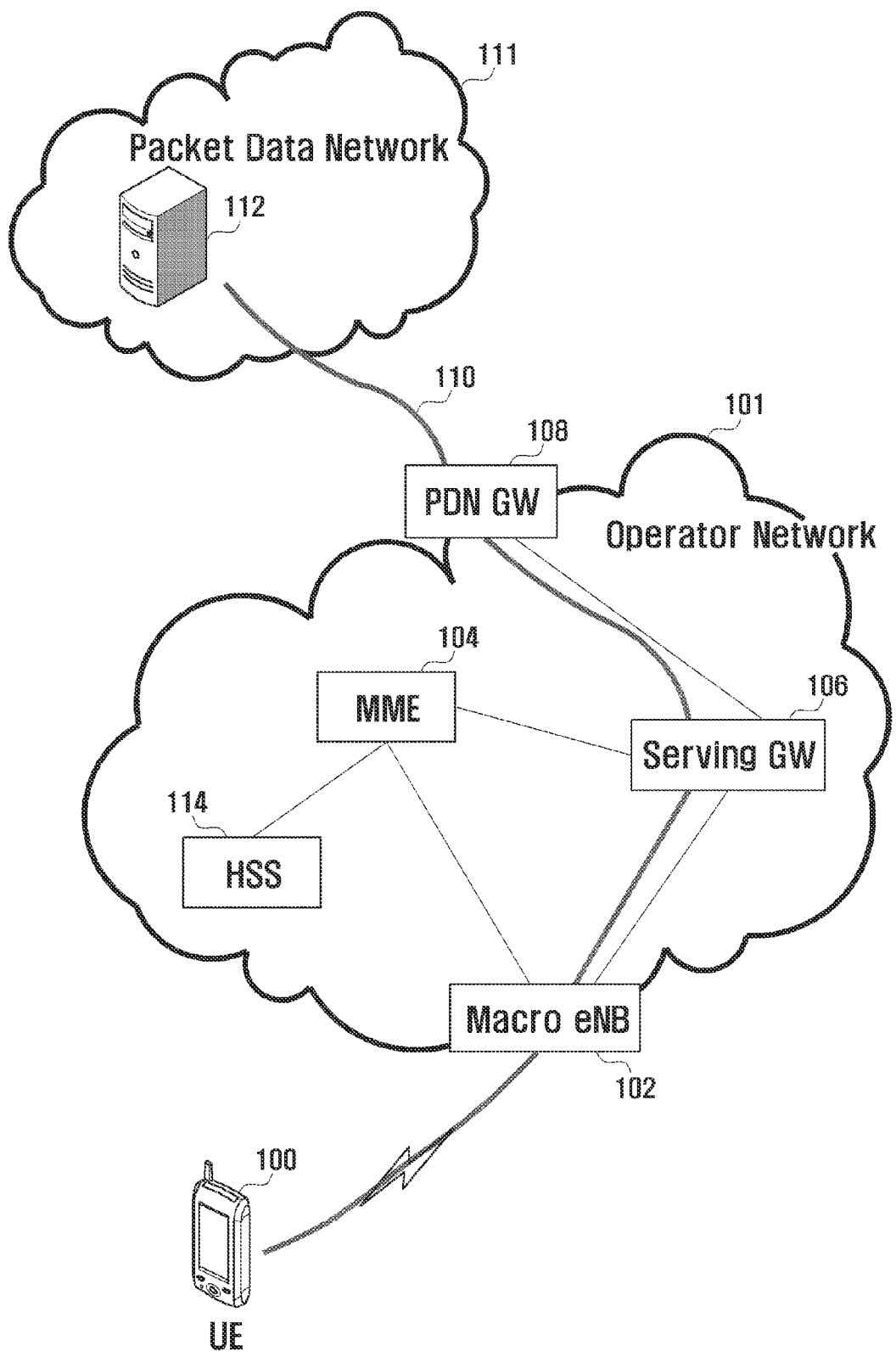
FIG. 1 is a block diagram illustrating a configuration of a wireless communication system according to an exemplary embodiment of the present invention.

FIG. 1 is a block diagram illustrating a configuration of a wireless communication system according to an exemplary embodiment of the present invention.

Referring to FIG. 1, the wireless communication system includes a UE 100, an operator network 101, and a packet data network 111.

For example, the UE 100 includes a portable terminal, a notebook computer, a tablet PC, a camera, a digital photo frame, a vending machine, a CCTV, and sensors such as an electrical measurement sensor, a water measurement sensor, a seismic sensor, a fire alarm sensor of buildings. The operator network 101 provides the voice service or the data service to the UE 100. That is, the operator network 101 supports communication between UEs 100, uploads packet data from the UE 100 to the packet data network 111, and downloads packet data from the packet data network 111. The packet data network 111 manages packet data transceiving to the UE 10. The packet data network 111 includes a management server 112 for managing the packet data or preset information of the UE 100 for providing the packet data.

In this case, the operator network includes a Macro enhanced Node B (hereinafter referred to as 'Macro eNB') 102, a mobility management entity (hereinafter referred to as 'MME') 104, a serving gateway (hereinafter referred to as 'S-GW') 106, a packet data network gateway (hereinafter referred to as 'P-GW') 108.

The Macro eNB 102 is a base station controlling a macro cell. The macro cell means a cell of a cellular system. The macro eNB 102 is a base station for managing and controlling the macro cell, but the macro cell and the macro eNB 102 have the same signification for the purpose of convenience in the present invention.

The macro eNB 102 is connected to the UE 100 through a wireless channel and controls a wireless resource. For example, the macro eNB 102 may generate control information necessary in a macro cell as system information and allocate a wireless resource to broadcast or transceiver data or control information with the UE 100. In this case, the broadcasted system information includes a Public Land Mobile Network Identifier (PLMN ID), an eNB Cell Global ID (ECGI), and a tracking Area ID (TAI). The macro eNB 102 collects and analyzes channel measuring result information of a current cell and neighboring cells from the UE 100 to determine handover and may command the handover. To this end, the macro eNB 102 include a control protocol such as a Radio Resource Control Protocol associated with wireless resource management.

The MME 104 manages a UE 100 in the idle mode, and selects a P-GW 108 and an S-GW 106. Further, the MME 104 performs roaming and authentication related functions. The MME 104 processes a bearer signal generated from the UE 100. Typically, a message transceived between the MME 104 and the UE 100 refers to a Non Access Stratum (NAS). The MME 104 supports a plurality of PAIS, and is connected to macro eNBs 102 supporting each TAI. Accordingly, the macro eNBs 102 supporting the same TAI have possibility to be connected to the same MME 104. The macro eNBs 102 supporting the different TAIs have possibility to be connected to different MMES 104.

Upon handover between eNBs 102 of the UE 100 or motion between 3GPP wireless networks, the S-GW 106 performs a function of a mobile anchor.

The P-GW 108 allocates an internet protocol (IP) address of the UE 100, performs a packet data related function of a core network, and performs a function of a mobile anchor upon movement between 3GPP wireless network and a non-3GPP wireless network. In addition, the P-GW 108 determines a bearer band to be provided to a subscriber, and performs forwarding and routing function with respect to packet data.

In this case, typically, an S1-MME interface is achieved between the Macro eNB 102 and the MME 104, an S1-U interface is achieved between the Macro eNB 102 and the S-GW 106, and an S5 interface is achieved between the S-GW 106 and the P-GW 108.

The wireless communication system may further include a Home Subscriber Sever (HSS) 114. In this case, the HSS 114 stores subscription information for each UE 100. When UE 100 accesses a network, the HSS 114 transfers subscription information of the UE 102 to the MME 104 so that the MME 104 uses the subscription information of the UE 120 to control the UE 100.

That is, when accessing the macro eNB 102, the UE 100 accesses a packet data network 111 using a data transmission path including the macro eNB 102, the S-GW 106, and the P-GW 108. Further, the UE 100 set connection with the macro eNB 102 and then transfers a NAS Request message to the MME 104. In this case, for example, the NAS request message may include an Attach Request message, a Tracking Area Update Request message or a Service Request message.

Figure 2:
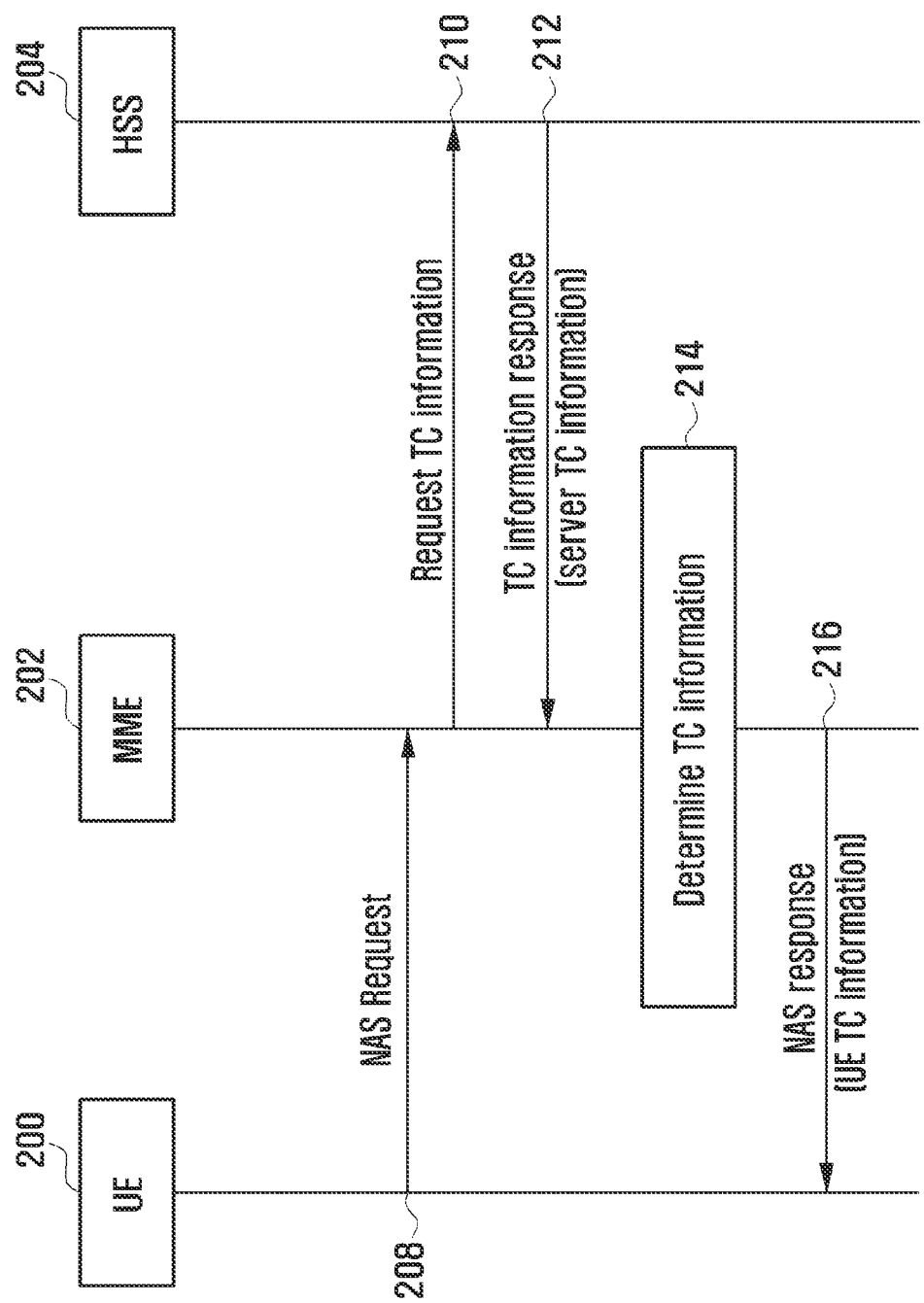
FIG. 2 is a flowchart illustrating signal flow for setting TC information of a UE in a wireless communication system according to a first embodiment of the present invention.

FIG. 2 is a flowchart illustrating signal flow for setting TC information of a UE in a wireless communication system according to a first embodiment of the present invention. In this case, the UE firstly cooperates with the MME, the wireless communication system according to the embodiment sets TC information to the UE and the MME. The TC information of the UE includes at least one of a Forbidden Time Interval (FTI) and a Granted Time Interval (GTI). The FTI represents time information in which the UE cannot access the network, and the GTI represents time information in which the UE can access the network. If necessary, the TC information of the UE may further include time zone information of each node.

Referring to FIG. 2, in the embodiment, the UE 200 firstly transmits an NAS request message to the MME 202 (208). In this case, the MME 202 may store preset default TC information. When the UE 200 receives the NAS request message, the MME 202 requests UE TC information to the HSS 204 (210). That is, upon first cooperation with the UE 200, the MME 202 requests UE subscribed TC information the HSS 204. The MME 202 may request subscription TC information by requesting subscription information of the UE 200. In this case, the HSS 204 may set and store subscription TC information for each UE 200. Further, when the MME requests the UE TC information, the HSS 204 transmits the UE subscribed TC information to the MME 202 (212).

Next, the MME 202 determines UE TC information (214). In this case, the MME 202 may determine UE TC information to be used for the UE 200 and the MME 202 as UE subscribed TC information. The MME 202 may determine UE TC information to be used for the UE 200 and the MME 202 in consideration of the default TC information. That is, the MME 202 may determine a UE FTI corresponding to at least one of the default TC information and the UE subscribed TC information. The MME 202 may a UE GTI corresponding to at least one of the default TC information and the UE subscribed TC information as a UE GTI. If the UE TC information forbids access of the UE for all time, the MME 202 may reset the default TC information as the UE TC information.

Next, the MME 202 provides UE TC information to the UE 200 (216). After that, the UE 200 uses the network service according to the UE TC information. That is, the UE does not access the network through the MME 202 at UE FTI but access the network through the MME 202 at the UE GTI according to the UE TC information. The MME 202 provides a network service to the UE 200 based on UE TC information.

That is, the MME 202 does not grant network access of the UE 200 at the UE FTI but grants the network access of the UE 200 at only the UE GTI.

Figure 3:
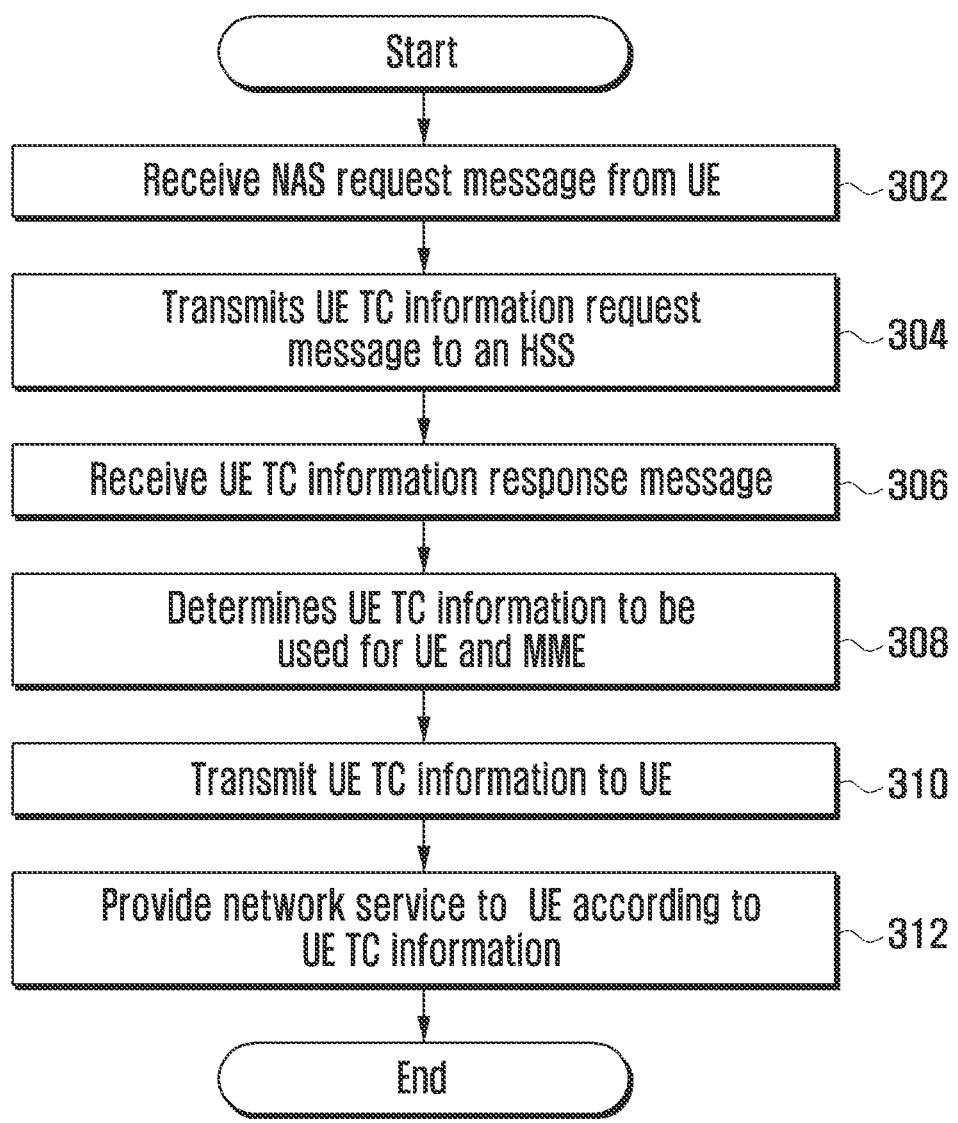
FIG. 3 is a flowchart illustrating an operation procedure of a mobility management entity (MME) of FIG. 2.

FIG. 3 is a flowchart illustrating an operation procedure of a mobility management entity (MME) of FIG. 2.

Referring to FIG. 3, when an NAS request message is received from the UE 200 (302), an MME 202 transmits a UE TC information request message to an HSS 204 (304). In this case, the MME 202 may store preset default TC information. Next, if a UE TC information response message is received (306), the MME 202 determines UE TC information to be used for the UE 200 and the MME 202 (308). In this case, the HHS 204 may set and store UE subscribed TC information for each UE 200. The UE TC information response message include UE subscribed TC information set corresponding to the UE 200. The MME 202 transmits the UE TC information to the UE 200 (310). The MME 202 provides a network service to the UE 200 according to the UE TC information (312).

The MME 202 may determine an FTI corresponding to at least one of the default TC information and the UE subscribed TC information as a UE FTI (308). The MME 202 may determine a GTI corresponding to at least one of the default TC information and the UE subscribed TC information as an UE GTI. If the UE TC information forbids UE access for all time, the MME 202 sets and uses default TC information as the UE TC information.

Meanwhile, the embodiment has illustrated that the HSS 204 sets and stores subscribed TC information for each UE 200, but the present invention is not limited thereto. For example, although the HSS 204 sets subscribed TC information by groups having a plurality of UEs 200 or equally sets the subscribed TC information to the UEs 200 according to a predetermined reference, the present invention may be implemented.

Meanwhile, the foregoing embodiment has illustrated an example of determining UE TC information by the MME, but the present invention is not limited thereto. That is, the present invention may be implemented by determining UE TC information in a network node other than the MME in the wireless communication system. For example, the HSS may determine and transmit the UE TC information to a UE and an MME in the wireless communication system.

Figure 4:
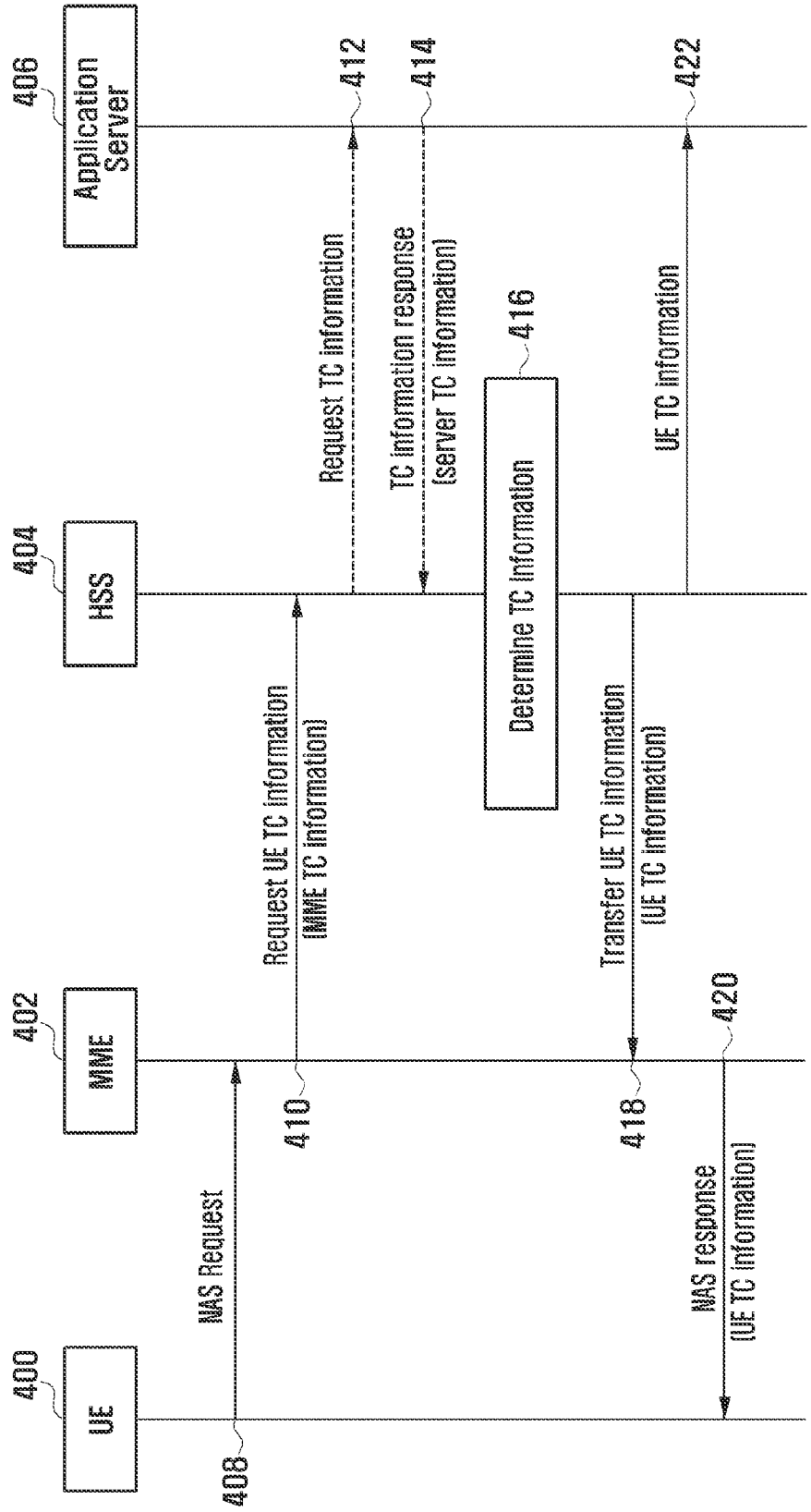
FIG. 4 is a flowchart illustrating signal flow for setting TC information of a UE in a wireless communication system according to a second embodiment of the present invention.

FIG. 4 is a flowchart illustrating signal flow for setting TC information of a UE in a wireless communication system according to a second embodiment of the present invention. In this case, the UE firstly cooperates with the MME, the wireless communication system according to the embodiment sets TC information to the UE, the MME, and an application server communicating with the UE. The TC information of the UE includes at least one of a Forbidden Time Interval (FTI) and a Granted Time Interval (GTI). The FTI represents time information in which the UE cannot access the network, and the GTI represents time information in which the UE can access the network. If necessary, the TC information of the UE may further include time zone information of each node.

Referring to FIG. 4, in the embodiment, a UE 400 transmits a NAS request message to the MME 402 (408). In this case, the MME 402 may store preset MME TC information. When the NAS request message is received from the UE 400, the MME 402 requests UE TC information to the HSS 404 (410). That is, when firstly cooperating with the UE 400, the MME 402 requests the UE TC information to the HSS 404. In this case, the MME 402 may request the UE TC information by requesting subscription information of the UE 400 to the HSS 404. The MME 402 may further transmit MME TC information to the HSS 404.

Next, when the MME 402 requests the UE TC information, the HSS 404 requests server TC information to the application server 406 (412). In this case, the application server 406 may store preset server TC information. When HSS 404 requests the server TC information, the application server 460 transfers the server TC information to the HSS 404 (414). In this case, the application server 406 may set and store the server TC information for each UE 400. However, when the HSS 404 recognizes the server TC information of the application server 406 in advance, steps 412 and 414 may be omitted.

Next, the HSS 404 determines UE TC information corresponding to the UE 400 (416). In this case, the HSS 404 may determine UE TC information to be used for the UE 400 and the MME 402 as the server TC information. The HSS 404 may determine UE TC information to be used for the UE 400 and the MME 402 in consideration of the MME TC information of the MME 402. That is, the HSS 404 may determine an FTI corresponding to at least one of the MME TC information and the server TC information as UE FTI. The HSS 404 may determine a GTI corresponding to at least one of the MME TC information and the server TC information as a UE GTI.

Subsequently, the HSS 404 provides the UE TC information to the MME 402 (418). When receiving the UE TC information from the HSS 404, the MME 402 provides the UE TC information to the UE 400 (420). Further, the HSS 404 may further provide the UE TC information to the application server 406 (422). After that, the UE 400 uses a network service according to the UE TC information. That is, the UE 400 does not access the application server 406 through the MME 402 at the UE FTI but accesses the application server 406 through the MME 402 at only the UE GTI according to the UE TC information. The MME 402 and the application server 406 provide the network service to the UE 400 based on the UE TC information. That is, the MME 402 and the application server 406 do not grant network access of the UE 400 at the UE FTI but grants the network access of the UE 400 at only the UE GTI.

Meanwhile if the UE TC information forbids UE access for all time, the HSS 404 may set the MME TC information as the UE TC information. Next, the HSS 404 may report that the UE TC information is optionally set together to the MME 402 and the HSS 406 together the UE TC information.

Figure 5:
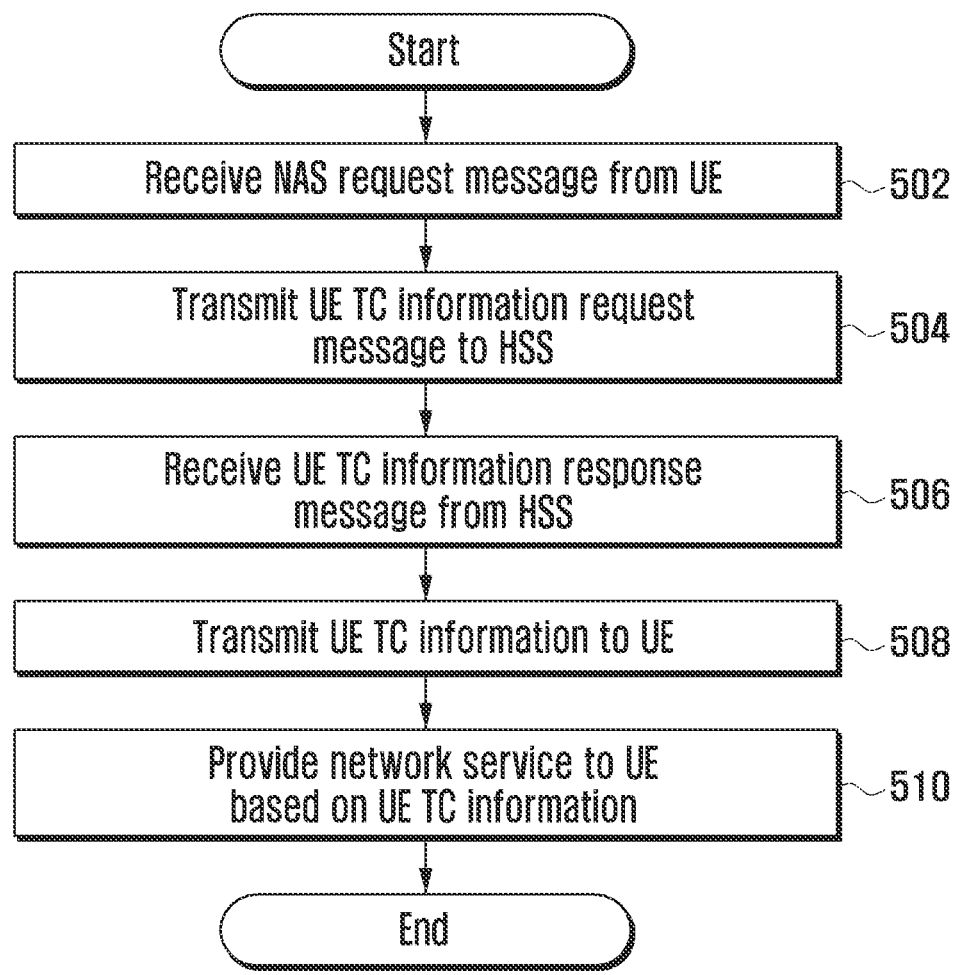
FIG. 5 is a flowchart illustrating an operation procedure of an MME of FIG. 4.

FIG. 5 is a flowchart illustrating an operation procedure of an MME of FIG. 4.

Referring to FIG. 5, if a NAS request message is received form the UE 400 (502), the MME 402 transmits a UE TC information request message to the HSS 404 (504). In this case, the MME 402 may store preset MME TC information. The MME 402 may transmit the MME TC information to the HSS 404 through the UE TC information request message. If the UE TC information response message is received from the HSS 404 (506), the MME 402 transmits the UE TC information to the UE 400 (508). In this case, the UE TC information is determined by the HSS 404, and is received from the HSS 404 through the UE information response message. The MME 402 provides the network service to the UE 400 based on the UE TC information (510).

Figure 6:
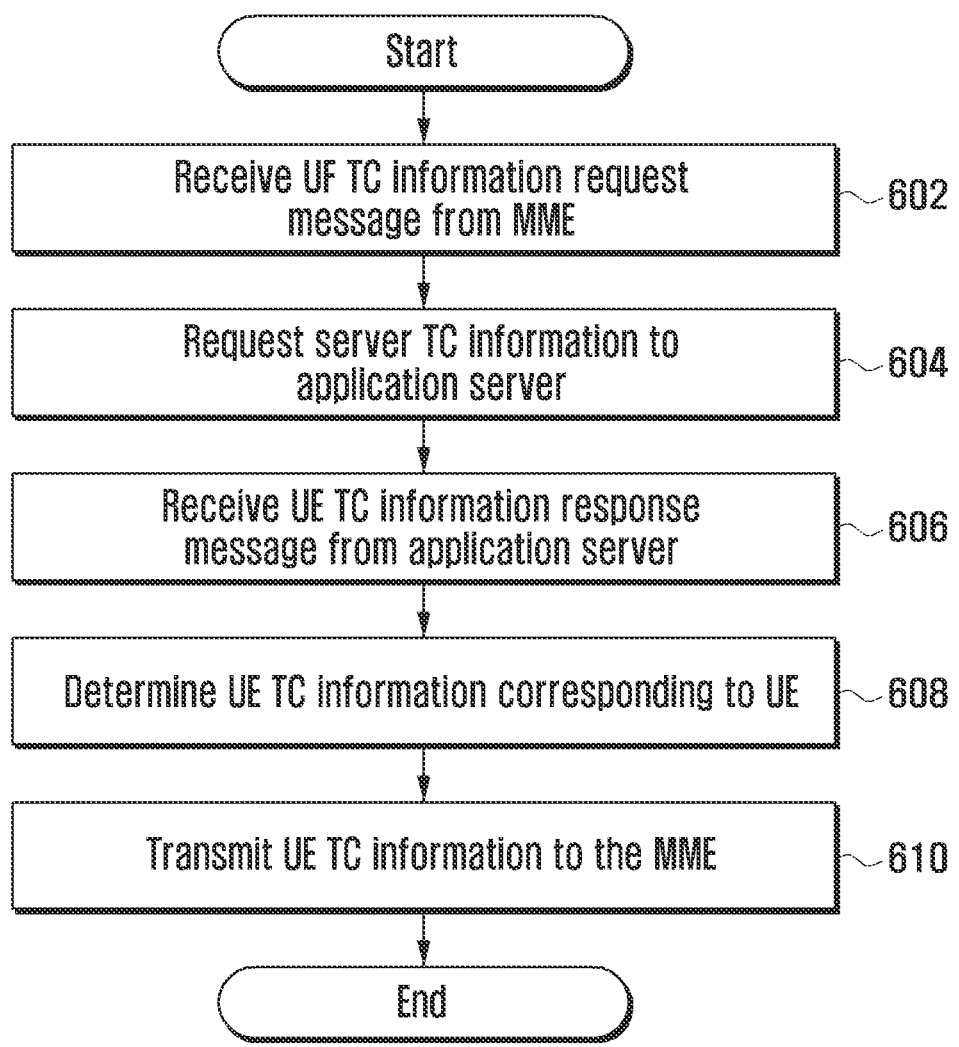
FIG. 6 is a flowchart illustrating an operation procedure of a home subscriber server (HSS) of FIG. 4.

FIG. 6 is a flowchart illustrating an operation procedure of a home subscriber server (HSS) of FIG. 4.

Referring to FIG. 6, if a UE TC information request message is received from the MME 402 (602), the HSS 404 requests server TC information to the application server 406 (604). In this case, the HSS 404 may receive the MME TC information through the UE TC information request message. If the UE TC information response message is received from the application server 406 (606), the HSS 404 determines the UE TC information corresponding to the UE (608). In this case, the HSS 404 receives the server TC information through the UE TC information response message. The HSS 404 transmits the UE TC information to the MME 402 (610). In this case, the HSS 404 may further transmit the UE TC information to the application server 406.

In this case, the HSS 404 may determine an FTI corresponding to at least one of the MME TC information and the server TC information as a UE FTI (608). The HSS 404 may determine a GTI corresponding to at least one of the MME TC information and the server TC information as the UE GTI.

Meanwhile, if the UE TC information forbids UE access for all time, the HSS 404 may set the MME TC information as UE TC information. Next, the HSS 404 may report to the MME 402 and the application server 406 that UE TC information is optionally set together with the UE TC information.

Meanwhile, the foregoing embodiments has illustrated that the MME transfers UE TC information to the UE, but the present invention is not limited thereto. That is, the wireless communication system transfers UE TC information to the UE in a network node other than the MME so that the present invention may be implemented. For example, a UE configuration update server managing setting information for each UE may transmit UE TC information to the UE.

Figure 7:
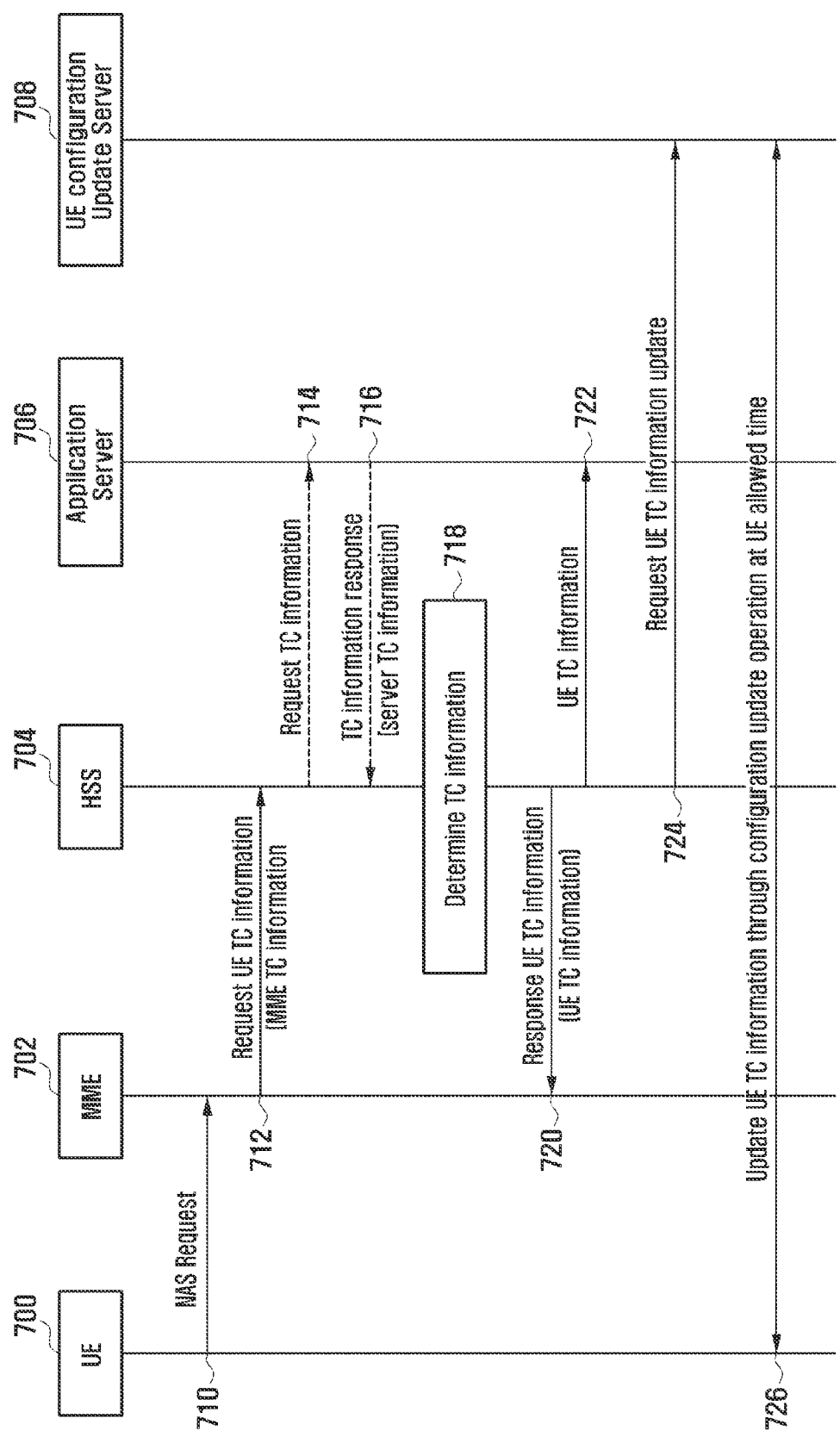
FIG. 7 is a flowchart illustrating signal flow for setting TC information of a UE in a wireless communication system according to a third embodiment of the present invention.

FIG. 7 is a flowchart illustrating signal flow for setting TC information of a UE in a wireless communication system according to a first embodiment of the present invention. In this case, in this embodiment, the UE firstly cooperates with the MME, the wireless communication system according to the embodiment sets TC information to the UE, the MME, and an application server communicating with the UE. The TC information includes at least one of an FTI and a GTI. The FTI represents time information in which the UE cannot access the network, and the GTI represents time information in which the UE may access the network. If necessary, the TC information of the UE may further include time zone information of each node.

Referring to FIG. 7, in the embodiment, a UE 700 firstly transmits an NAS request message to the MME 702 (710). In this case, the MME 702 may store preset MME TC information. When the NAS request message is received from the UE 700, the MME 702 requests UE TC information to the HSS 704 (712). That is, when firstly cooperating with the UE 700, the MME 702 requests the UE TC information to the HSS 704. In this case, the MME 702 may request the UE TC information by requesting subscription information of the UE 700 to the HSS 704. The MME 702 may further transmit MME TC information to the HSS 704.

Next, when the MME 702 requests the UE TC information, the HSS 704 requests server TC information to the application server 706 (714). In this case, the application server 706 may store preset server TC information. When HSS 704 requests the server TC information, the application server 706 transfers the server TC information to the HSS 704 (716). In this case, the application server 706 may set and store the server TC information for each UE 700. However, when the HSS 704 recognizes the server TC information of the application server 706 in advance, steps 714 and 716 may be omitted.

Next, the HSS 704 determines UE TC information corresponding to the UE 700 (718). In this case, the HSS 704 may determine UE TC information to be used for the UE 700 and the MME 702 as the server TC information. The HSS 704 may determine UE TC information to be used for the UE 700 and the MME 702 in consideration of the MME TC information of the MME 702. That is, the HSS 404 may determine an FTI corresponding to at least one of the MME TC information and the server TC information as UE FTI. The HSS 704 may determine a GTI corresponding to at least one of the MME TC information and the server TC information as a UE GTI.

Subsequently, the HSS 704 provides the UE TC information to the MME 702 (720). Further, the HSS 704 may further provide the UE TC information to the application server 706 (722). Next, the MME 702 and the application server 706 provide a network service to the UE 700 based on the UE TC information. That is, the MME 702 and the application server 706 do not grant network access of the UE 700 at the UE FTI but grants the network access of the UE 700 at only the UE GTI.

Meanwhile, the HSS 704 transfers UE TC information to the UE configuration update server 708 (724). The UE configuration update server 708 may be an Open Mobile Alliance (OMA) server or an Over the Air (OTA) server. In this case, the UE configuration update server 708 confirms a UE allowed time in which network access of the UE 700 is allowed through UE TC information. The UE configuration update server 708 transfers the UE TC information to the UE 700 at the UE allowed time (726). Next, the UE 700 uses the network service based on the UT TC information. That is, the UE does not access the application server 706 through the MME 702 at the UE FTI but accesses the application server 706 through the MME 702 at only the UE GTI according to the UE TC information.

Meanwhile, when the UE TC information forbids UE access for all time, the HSS 704 may set the MME TC information as the UT TC information. Next, the HSS 704 may report to the MME 702 and the HSS 706 that the UE TC information is optionally set together with the UE TC information.

Figure 8:
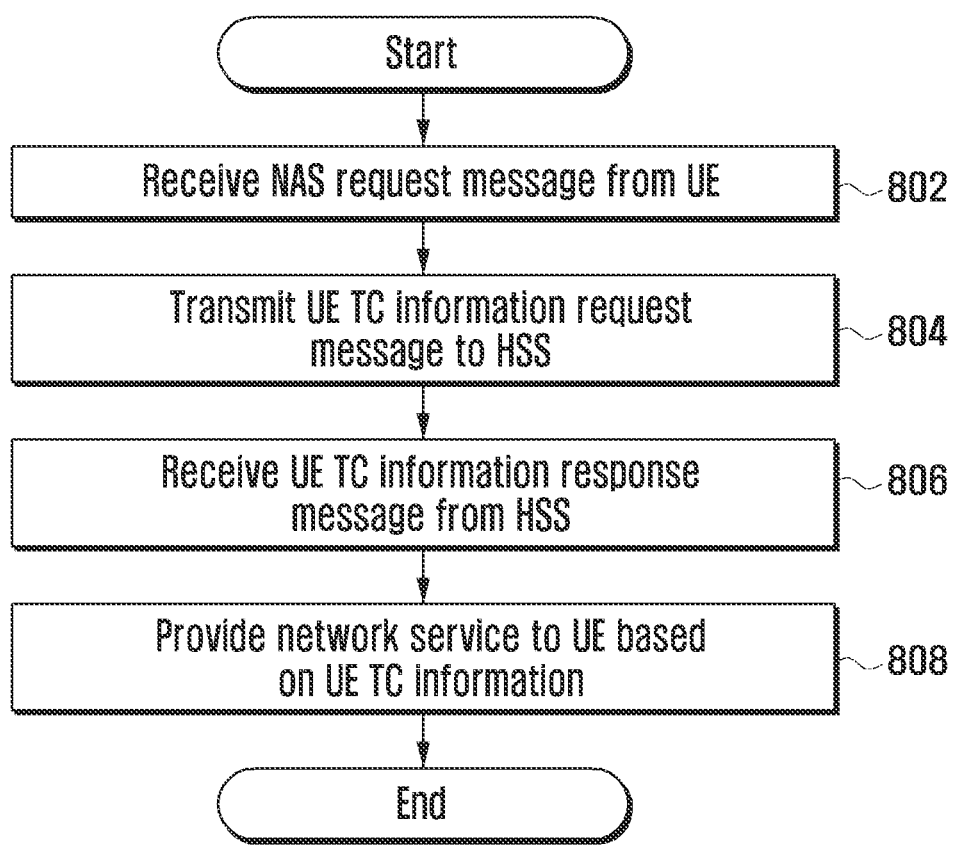
FIG. 8 is a flowchart illustrating an operation procedure of an MME of FIG. 7.

FIG. 8 is a flowchart illustrating an operation procedure of an MME of FIG. 7.

Referring to FIG. 5, if a NAS request message is received form the UE 700 (802), the MME 702 transmits a UE TC information request message to the HSS 704 (804). In this case, the MME 702 may store preset MME TC information. The MME 702 may transmit the MME TC information to the HSS 704 through the UE TC information request message. If the UE TC information response message is received from the HSS 704 (806), the MME 702 provides the network service to the UE 700 based on the UE TC information (808).

Figure 9:
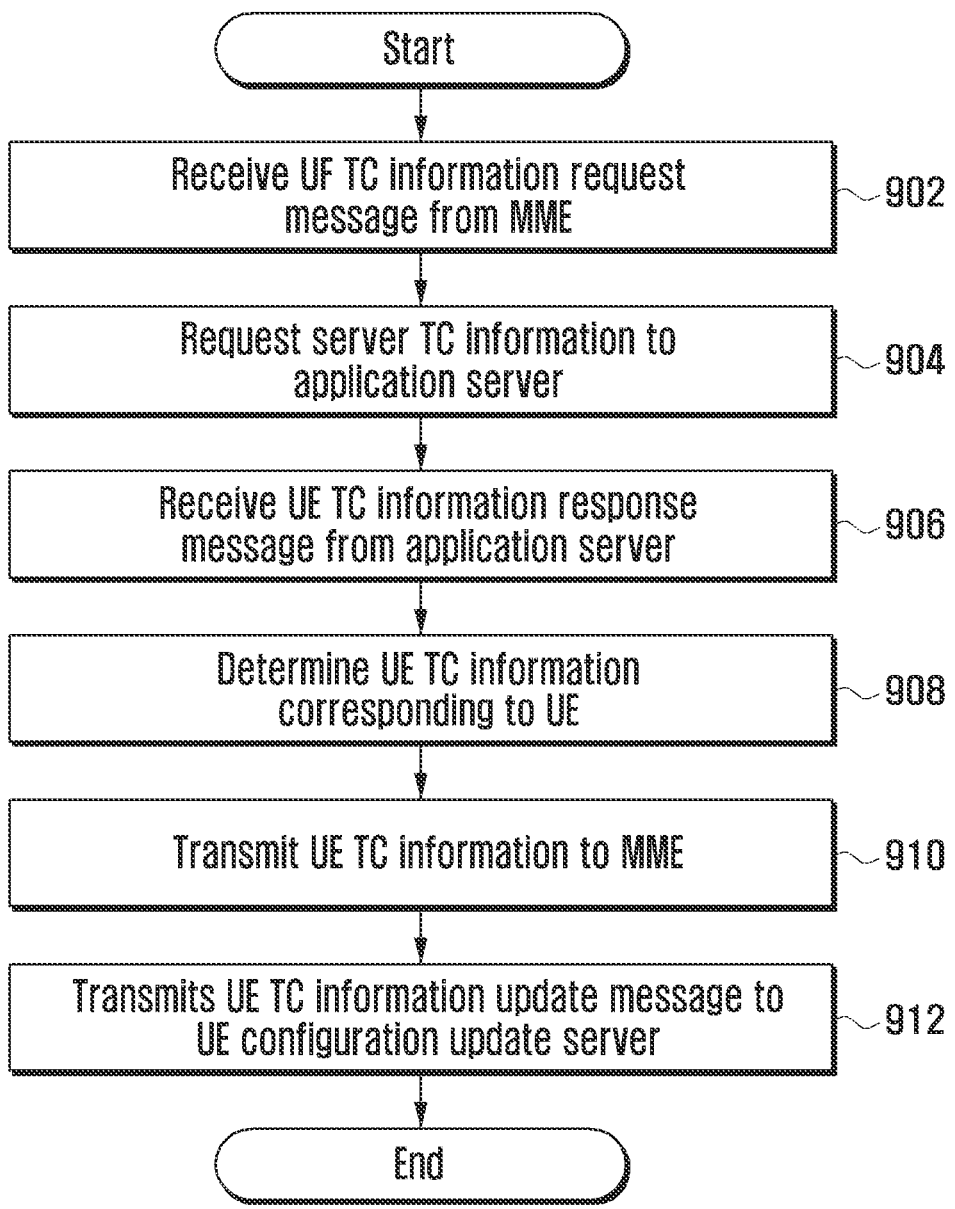
FIG. 9 is a flowchart illustrating an operation procedure of an HSS of FIG. 7.

FIG. 9 is a flowchart illustrating an operation procedure of an HSS of FIG. 7.

Referring to FIG. 9, if a UE TC information request message is received from the MME 702 (902), the HSS 704 requests server TC information to the application server 706 (904). In this case, the HSS 704 may receive the MME TC information through the UE TC information request message. If the UE TC information response message is received from the application server 706 (906), the HSS 704 determines the UE TC information corresponding to the UE (908). In this case, the HSS 704 receives the server TC information through the UE TC information response message. The HSS 704 transmits the UE TC information to the MME 702 (910). In this case, the HSS 704 may further transmit the UE TC information to the application server 706. The HSS 704 transmits UE TC information update message to the UE configuration update server 708 (912). In this case, the HSS 704 transmits the UE TC information through the UE TC information update message.

In this case, the HSS 704 may determine an FTI corresponding to at least one of the MME TC information and the server TC information as a UE FTI (908). The HSS 704 may determine a GTI corresponding to at least one of the MME TC information and the server TC information.

Meanwhile, if the UE TC information forbids UE access for all time, the HSS 704 may set the MME TC information as UE TC information. Next, the HSS 704 may report to the MME 702 and the application server 706 that UE TC information is optionally set together with the UE TC information.

Figure 10:
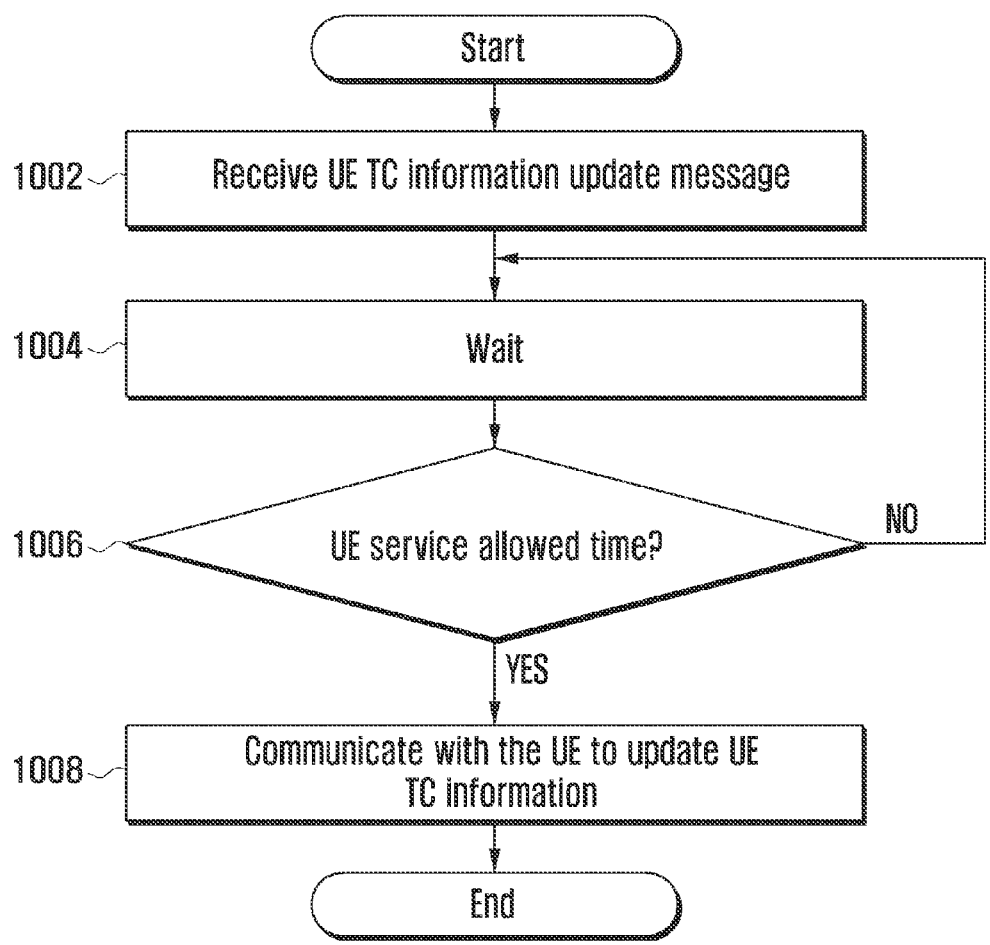
FIG. 10 is a flowchart illustrating an operation procedure of a UE configuration update server of FIG. 7.

FIG. 10 is a flowchart illustrating an operation procedure of a UE configuration update server of FIG. 7.

Referring to FIG. 10, when UE TC information update message is received from the HSS 704 (1002), the UE configuration update server 708 analyzes the UE TC information update message and waits (1004). In this case, the UE configuration update server 708 confirms a UE service allowed time in which network access of the UE 700 is allowed through the UE TC information. Next, when the UE service allowed time comes, the UE configuration update server 708 detects the UE service allowed time (1006) and communicates with the UE 700 to update UE TC information (1008). That is, the UE configuration update server 708 transfers the UE TC information to the UE 700. When the UE service allowed time does not come, the UE configuration update server 708 returns to step 1004 and continuously waits until the UE service allowed time comes.

Figure 11:
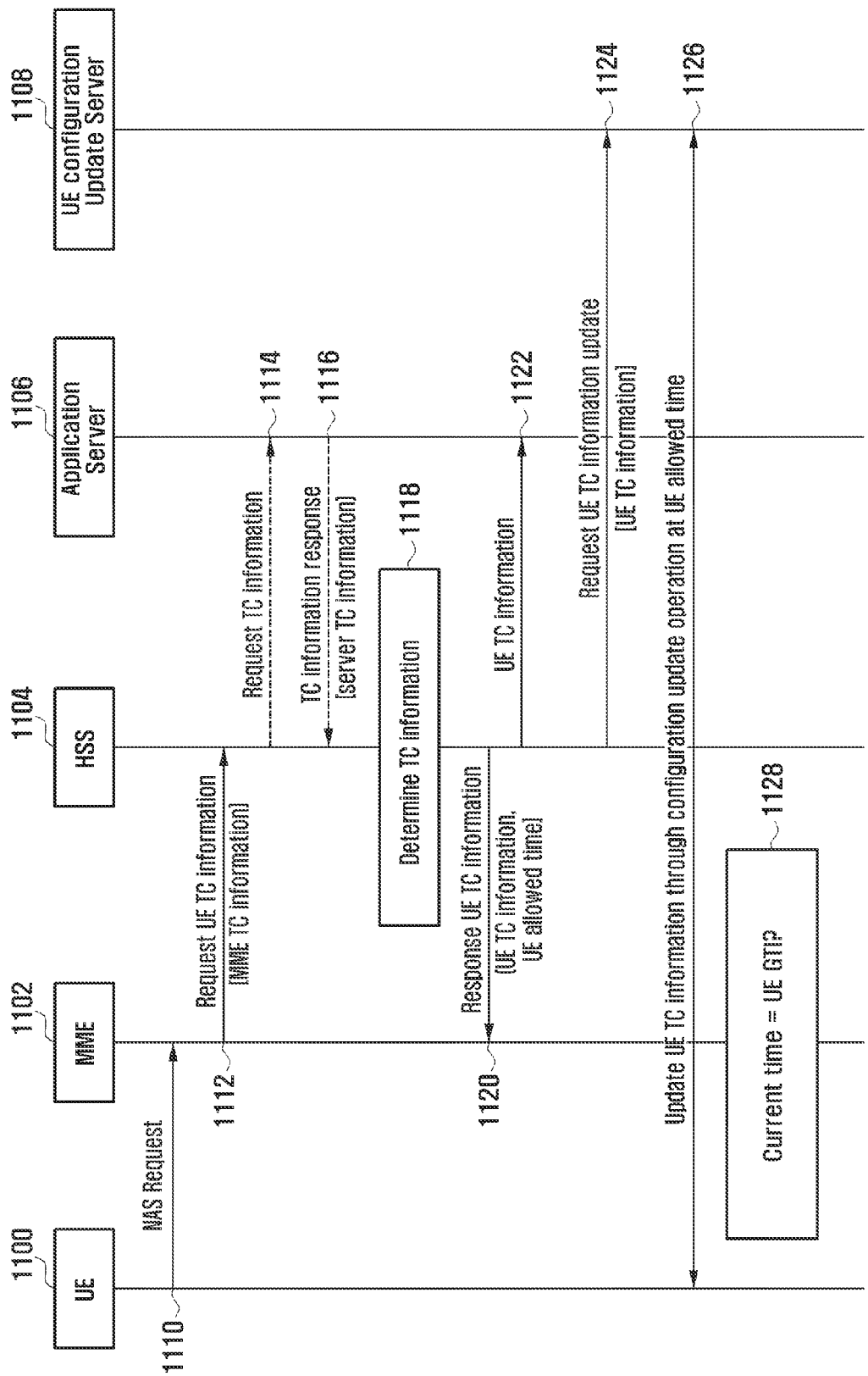
FIG. 11 is a flowchart illustrating signal flow for setting TC information of a UE in a wireless communication system according to a fourth embodiment of the present invention.

FIG. 11 is a flowchart illustrating signal flow for setting TC information of a UE in a wireless communication system according to a fourth embodiment of the present invention. In this case, in this embodiment, the UE firstly cooperates with the MME, the wireless communication system according to the embodiment sets TC information to the UE, the MME, and an application server communicating with the UE. The TC information includes at least one of an FTI and a GTI. The FTI represents time information in which the UE does not access the network, and the GTI represents time information in which the UE may access the network. If necessary, the TC information of the UE may further include time zone information of each node.

Referring to FIG. 11, in the embodiment, a UE 1100 firstly transmits an NAS request message to the MME 1102 (1110). In this case, the MME 1102 may store preset MME TC information. When the NAS request message is received from the UE 1100, the MME 1102 requests UE TC information to the HSS 1104 (1112). That is, when firstly cooperating with the UE 1100, the MME 1102 requests the UE TC information to the HSS 1104. In this case, the MME 1102 may request the UE TC information by requesting subscription information of the UE 1100. The MME 1102 may further transmit MME TC information to the HSS 1104.

Next, when the MME 1102 requests the UE TC information, the HSS 1104 requests server TC information to the application server 1106 (1114). In this case, the application server 1106 may store preset server TC information. When HSS 1104 requests the server TC information, the application server 1160 transfers the server TC information to the HSS 1104 (1116). In this case, the application server 1106 may set and store the server TC information for each UE 1100. However, when the HSS 1104 recognizes the server TC information of the application server 1106 in advance, steps 1114 and 1116 may be omitted.

Next, the HSS 1104 determines UE TC information corresponding to the UE 1100 (1118). In this case, the HSS 1104 may determine UE TC information to be used for the UE 1100 and the MME 1102 as the server TC information. The HSS 1104 may determine UE TC information to be used for the UE 1100 and the MME 1102 in consideration of the MME TC information of the MME 1102. That is, the HSS 1104 may determine an FTI corresponding to at least one of the MME TC information and the server TC information as UE FTI. The HSS 1104 may determine a GTI corresponding to at least one of the MME TC information and the server TC information as a UE GTI.

Subsequently, the HSS 1104 provides the UE TC information to the MME 1102 (1120). In this case, the HSS 1104 may set and transmit a UE allowed interval in which network access of the UE 1100 is allowed. Further, the HSS 1104 may further provide the UE TC information to the application server 1106 (1122). Next, the MME 1102 and the application server 1106 provide a network service to the UE 1100 based on the UE TC information. That is, the MME 1102 and the application server 1106 do not grant network access of the UE 1100 at the UE FTI but grants the network access of the UE 1100 at only the UE GTI. In addition, the MME 1102 may further allow the network access of the UE 110 at the UE allowed interval.

Meanwhile, the HSS 1104 transfers UE TC information to the UE configuration update server 1108 (1124). The HSS 1104 may set and transmit the UE allowed interval. The UE configuration update server 1108 may be an OMA server or an OTA server. The UE configuration update server 1108 transfers the UE TC information to the UE 1100 at the UE allowed interval (1126). Next, the UE 1100 uses the network service based on the UT TC information. That is, the UE does not access the application server 1106 through the MME 1102 at the UE FTI but accesses the application server 1106 through the MME 1102 at only the UE GTI according to the UE TC information. The UE 1100 may further access the application server 1106 through the MME 1102 at a UE allowed interval. In this case, when the UE allowed interval is terminated, the MME 1102 determines whether a current time is a UE GTI (1128). If the current time is a UE GTI, the MME 1102 continuously allows the network access of the UE 1100. If the current time is a UE FTI, the MME 1102 terminates a network service to the UE 1100.

Meanwhile, when the UE TC information forbids UE access for all time, the HSS 1104 may set the MME TC information as the UT TC information. Next, the HSS 1104 may report to the MME 1102 and the HSS 1106 that the UE TC information is optionally set together with the UE TC information.

Figure 12:
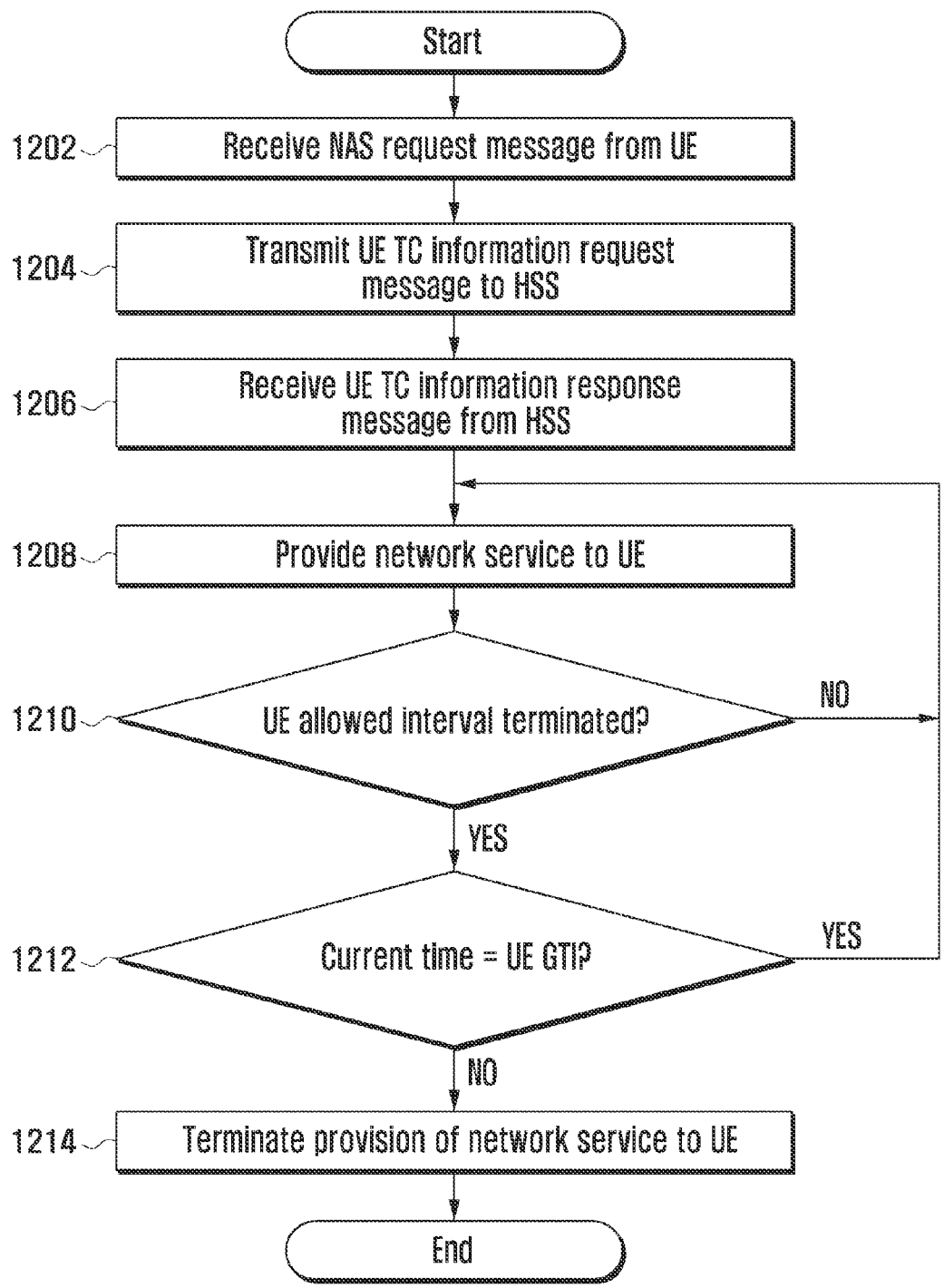
FIG. 12 is a flowchart illustrating an operation procedure of an MME of FIG. 11.

FIG. 12 is a flowchart illustrating an operation procedure of an MME of FIG. 11.

Referring to FIG. 12, if a NAS request message is received form the UE 1100 (1202), the MME 1102 transmits a UE TC information request message to the HSS 1104 (1204). In this case, the MME 1102 may store preset MME TC information. The MME 1102 may transmit the MME TC information to the HSS 1104 through the UE TC information request message. If the UE TC information response message is received from the HSS 1104 (1206), the MME 1102 provides the network service to the UE 1100 based on the UE TC information (1208). The MME 1102 may further receive the UE allowed interval through the UE TC information response message. The MME 1102 grants the network access of the UE 1100 at the UE allowed interval or the UE GTI.

The MME 1102 determines whether the UE allowed interval is terminated (1210). If the UE allowed interval is terminated at step 1210, the MME 1102 determines whether a current time corresponds to the UE GTI (1212). When the current time does not correspond to the UE GTI but corresponds to a UE FTI at step 1212, the MME 1102 terminates a provision of the network service to the UE 1100 (1214). If the UE allowed interval is not terminated at step 1210 or the current time corresponds to the UE GTI, the MME 1102 returns to step 1208 and maintains the provision of the network service to the UE 1100.

Figure 13:
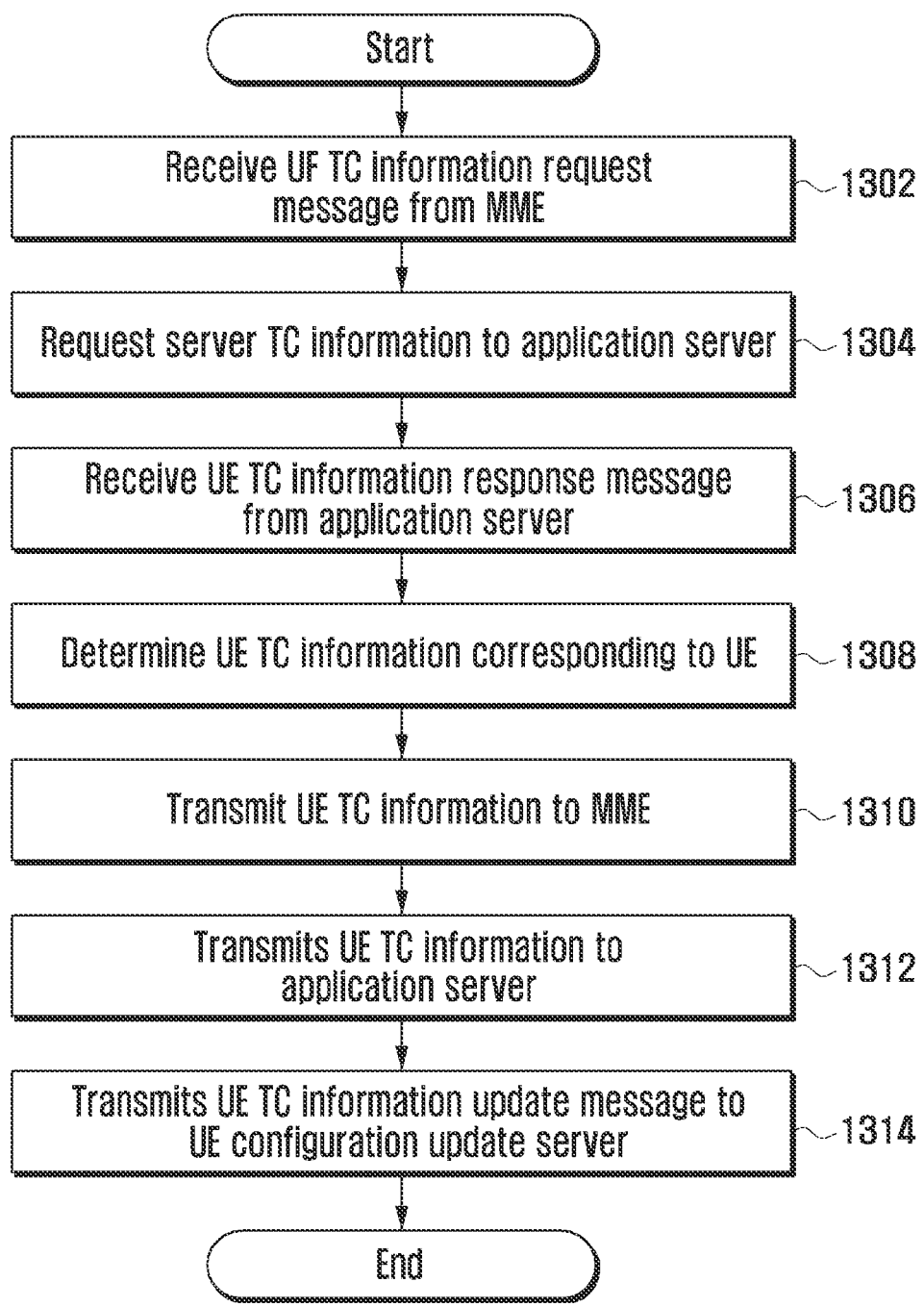
FIG. 13 is a flowchart illustrating an operation procedure of an HSS of FIG. 11.

FIG. 13 is a flowchart illustrating an operation procedure of an HSS of FIG. 11.

Referring to FIG. 13, if a UE TC information request message is received from the MME 1102 (1302), the HSS 1104 requests server TC information to the application server 1106 (1304). In this case, the HSS 1104 may receive the MME TC information through the UE TC information request message. If the UE TC information response message is received from the application server 1106 (1306), the HSS 1104 determines the UE TC information corresponding to the UE (1308). In this case, the HSS 1104 receives the server TC information through the UE TC information response message.

The HSS 1104 transmits the UE TC information to the MME 1102 (1310). In this case, the HSS 1104 may further transmit the UE allowed interval to the MME 1102. The HSS 1104 may further transmit the UE TC information to the application server 1106 (1312). The HSS 1104 transmits UE TC information update message to the UE configuration update server 1108 (1314). In this case, the HSS 1104 transmits the UE TC information through the UE TC information update message. The HSS 1104 may further transmit the UE allowed interval through the UE TC.

In this case, the HSS 1104 may determine an FTI corresponding to at least one of the MME TC information and the server TC information as a UE FTI (1308). The HSS 1104 may determine a GTI corresponding to at least one of the MME TC information and the server TC information. Meanwhile, if the UE TC information forbids UE access for all time, the HSS 1104 may set the MME TC information as UE TC information. Next, the HSS 1104 may report to the MME 702 and the application server 706 that UE TC information is optionally set together with the UE TC information.

Figure 14:
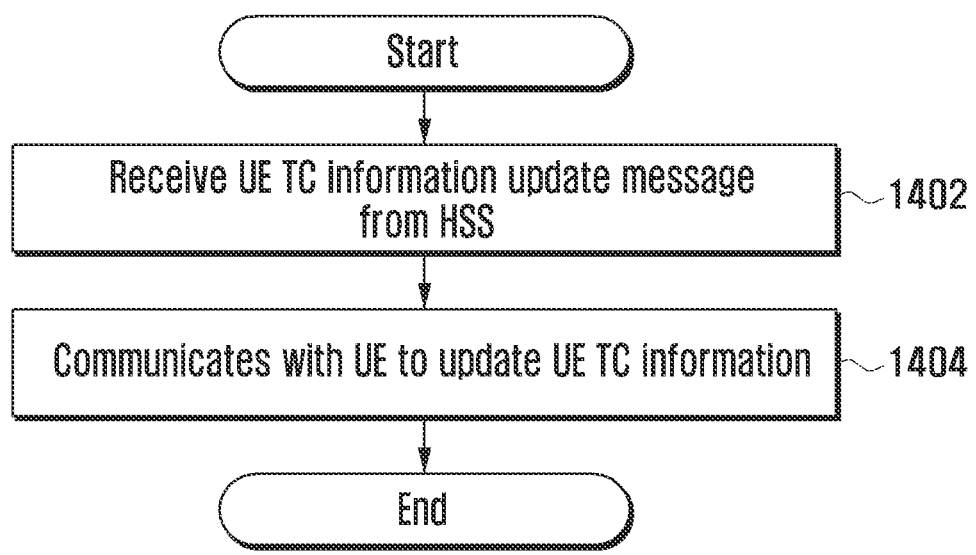
FIG. 14 is a flowchart illustrating an operation procedure of a UE configuration update server of FIG. 11.

FIG. 14 is a flowchart illustrating an operation procedure of a UE configuration update server of FIG. 11.

Referring to FIG. 14, when UE TC information update message is received from the HSS 1104 (1402), the UE configuration update server 1108 communicates with the UE 1100 to update the UE TC information (1404). In this case, the UE configuration update server 1108 receives the UE TC information through the UE TC information update message. The UE configuration update server 1108 may further receive the UE GTI through the UE TC information update message.

That is, in the embodiments, the UE transmits the NAS request message to the MME. The UE receives the NAS response message from the MME. In this case, the UE may receive the UE TC information through the NAS response message. In other words, the UE may receive the UE TC information from the MME. The UE may receive the UE TC information from the UE configuration update server. Accordingly, the UE may access the network based on the UT TC information to use the service. To this end, the UE includes a transceiver and a controller. The transceiver performs a communication function of the UE. The controller controls the transceiver to transmit the NAS request message to the MME, and receive the NAS response message from the MME. The controller accesses the network based on the UE TC information to use the service.

Meanwhile, the foregoing embodiments have illustrated an example which receives and recognizes the UE TC information, and uses the network service according to the UE TC information, but the present invention is not limited thereto. That is, according to the wireless communication system although the UE does not recognize the UE TC information, the present invention may be implemented. For example, in a state that the UE TC information is not recognized, the UE may use the network service. In this case, the UE may transmit a message for accessing to the application service through the MME. However, since the MME and the application server recognizes the UE TC information, the MME and the application server may not provide the network service. That is, when the UE receive a message, the MME and the application server may determine whether a current is a UE FTI. If the current time is the UT FTI, the MME and the application server may disregard a message of the UE. Accordingly, when receiving the UE TC information, the MME or the UE configuration update server do not transmit the UE TC information to the UE, the present invention may be implemented.

Meanwhile, the foregoing embodiments have illustrated an example which the MME determines, receives and recognizes the UE TC information, and provides the network service the UE according to the UE TC information, but the present invention is not limited thereto. That is, in the wireless communication system, although the MME does not recognize the UE TC information, the present invention may be implemented. For example, since the UE recognizes the UE TC information, the UE does not use the network service at the UE FTI but uses the network service at only the UT GTI. In this case, the UE may transmit a message for network access to the MME at the UE GTI. Accordingly, since a receiving time of a message by the UE is the UE FTI, although the MME does not recognize separate UE TC information, the present invention may be implemented.

According to the present invention, in the method and the apparatus for setting control information of a UE according to a time, the UE access a network at only a specific time to receive a service, and the network access is blocked at remaining times. Accordingly, this prevents the network from simultaneously providing a service to a plurality of UEs, and the network time-separately provides the service. Therefore, the wireless communication system can uniformly maintain a service quality for a plurality of UEs, and can improve network usability.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of controlling access of a user equipment (UE) in a wireless communication system, the method comprising:
   transmitting, by a mobility management entity (MME), a request for first time control information of the UE to a home subscriber server (HSS) if the MME receives a non access stratum (NAS) request from the UE;
   determining, by the MME, time control information based on at least one of the first time control information and second time control information if the MME receives the first time control information from the HSS;
   transmitting, by the MME, a NAS response including the time control information to the UE; and
   providing, by the MME, a network service to the UE based on the time control information.

2. The method of claim 1, wherein the first time control information comprises subscribed time control information.

3. A method of controlling access of a user equipment (UE) in a wireless communication system, the method comprising:
   receiving, by a home subscriber server (HSS), a request for time control information of the UE from a mobility management entity (MME) if a non access stratum (NAS) request is transmitted from the UE to the MME;
   transmitting, by the HSS, a request for first time control information to an application server;
   determining, by the HSS, the time control information based on at least one of the first time control information and second time control information, if the HSS receives the first time control information from the application server; and
   transmitting, by the HSS, the time control information to the MME,
   wherein the time control information is used for providing a network service to the UE.

4. The method of claim 3, wherein the second time control information comprises MME time control information.

5. The method of claim 3, wherein the transmitting of the time control information comprises:
   transmitting, by the HSS, the time control information to the application server.

6. A method of controlling access of a user equipment (UE) in a wireless communication system, the method comprising:
   transmitting, by the UE, a non access stratum (NAS) request to a mobility management entity (MME); and
   receiving, by the UE, a NAS response including time control information,
   wherein the time control information is determined based on at least one of first time control information and second time control information and is used in order for the UE to be provided with a network service.

7. The method of claim 6, further comprising accessing a network of the MME based on the time control information.

8. A mobility management entity (MME) for controlling access of a user equipment (UE), the MME comprising:
   a transceiver configured to transmit signals; and
   a controller configured to transmit a request for first time control information to a home subscriber server (HSS) if the MME receives a non access stratum (NAS) request from the UE, to determine time control information based on at least one of the first time control information and second time control information if the MME receives the first time control information from the HSS, to transmit a NAS response including the time control information to the UE, and to provide a network service to the UE based on the time control information.

9. The MME of claim 8, wherein the first time control information comprises subscribed time control information.

10. A home subscriber server (HSS) for controlling access of a user equipment (UE), the HSS comprising:
    a transceiver configured to transmit signals; and
    a controller configured to receive a request for time control information from a mobility management entity (MME) if a non access stratum (NAS) request is transmitted from the UE to the MME, to transmit a request for first time control information to an application server, to determine the time control information based on at least one of the first time control information and second time control information if the HSS receives the first time control information from the application server, and to transmit the time control information to the MME,
    wherein the time control information is used for providing a network service to the UE.

11. The HSS of claim 10, wherein the second time control information comprises MME time control information.

12. The HSS of claim 10, wherein the first time control information comprises server time control information.

13. A user equipment (UE) for controlling access in a wireless communication system, the UE comprising:

a transceiver configured to communicate with a mobility management entity (MME); and a controller configured to transmit a non access stratum (NAS) request to the MME, and to receive a NAS response including time control information from the MME, wherein the time control information is determined based on at least one of the first time control information and second time control information and is used in order for the UE to be provided with a network service.

14. The UE of claim 13, wherein the controller is configured to access a network of the MME based on the time control information.

15. The method of claim 1, wherein the second time control information comprises default time control information.

16. The method of claim 1, wherein the time control information comprises at least one of a forbidden time interval (FTI) and a granted time interval (GTI).

17. The method of claim 16, wherein the MME provides a network service to the UE based on the GTI included in the time control information.

18. The method of claim 3, wherein the first time control information comprises server time control information.

19. The method of claim 3, wherein the second time control information comprises MME time control information.

20. The method of claim 3, wherein the time control information comprises at least one of a forbidden time interval (FTI) and a granted time interval (GTI).

21. The method of claim 20, wherein the GTI included in the time control information is used for providing a network service to the UE.

22. The method of claim 6, wherein the first time control information comprises subscribed time control information.

23. The method of claim 6, wherein the second time control information comprises default time control information.

24. The MME of claim 8, wherein the second time control information comprises default time control information.

25. The MME of claim 8, wherein the time control information comprises at least one of a forbidden time interval (FTI) and a granted time interval (GTI).

26. The MME of claim 25, wherein the controller is configured to provide a network service to the UE based on the GTI included in the time control information.

27. The HSS of claim 10, wherein the time control information comprises at least one of a forbidden time interval (FTI) and a granted time interval (GTI).

28. The HSS of claim 27, wherein the GTI included in the time control information is used for providing a network service to the UE.

29. The UE of claim 13, wherein the second time control information comprises default time control information.

30. The UE of claim 13, wherein the first time control information comprises subscribed time control information.

* * * * *